(12) United States Patent
Myers

(10) Patent No.: US 12,529,456 B2
(45) Date of Patent: Jan. 20, 2026

(54) FLASHLIGHT WITH WIRELESS CONTROL SWITCHES

(71) Applicant: Robert Myers, San Marcos, CA (US)

(72) Inventor: Robert Myers, San Marcos, CA (US)

( * ) Notice: Subject to any disclaimer, the term of this patent is extended or adjusted under 35 U.S.C. 154(b) by 0 days.

(21) Appl. No.: 18/396,047

(22) Filed: Dec. 26, 2023

(65) Prior Publication Data

US 2024/0125465 A1   Apr. 18, 2024

Related U.S. Application Data

(63) Continuation-in-part of application No. 17/517,852, filed on Nov. 3, 2021, now Pat. No. 11,852,306.

(51) Int. Cl.
| | |
|---|---|
| *F21L 4/08* | (2006.01) |
| *F21L 4/00* | (2006.01) |
| *F21V 23/04* | (2006.01) |
| *H02J 7/00* | (2006.01) |

(52) U.S. Cl.
CPC .............. *F21L 4/085* (2013.01); *F21L 4/005* (2013.01); *F21V 23/04* (2013.01); *H02J 7/0044* (2013.01)

(58) Field of Classification Search
CPC .............................. H02J 7/0044; F21V 23/04
See application file for complete search history.

(56) References Cited

U.S. PATENT DOCUMENTS

| | | | | |
|---|---|---|---|---|
| 2005/0012633 | A1* | 1/2005 | Yoon | H01H 9/182 340/815.4 |
| 2016/0041584 | A1* | 2/2016 | DeSilva | H02J 7/00 320/114 |
| 2017/0167669 | A1* | 6/2017 | Purkiss | F21V 23/0414 |
| 2019/0154242 | A1* | 5/2019 | Grandadam | F21L 4/00 |

* cited by examiner

*Primary Examiner* — Alexander K Garlen
(74) *Attorney, Agent, or Firm* — John R. Ross, III; John R. Ross

(57) ABSTRACT

A storage device for storing a removable flashlight. The storage device includes an electrical switch surrounded by a cover plate. A power source is electrically connected to the electrical switch. A removable flashlight is removably connected to the storage device. The removable flashlight is stored in the storage device and removable from the storage device when needed for use.

4 Claims, 9 Drawing Sheets

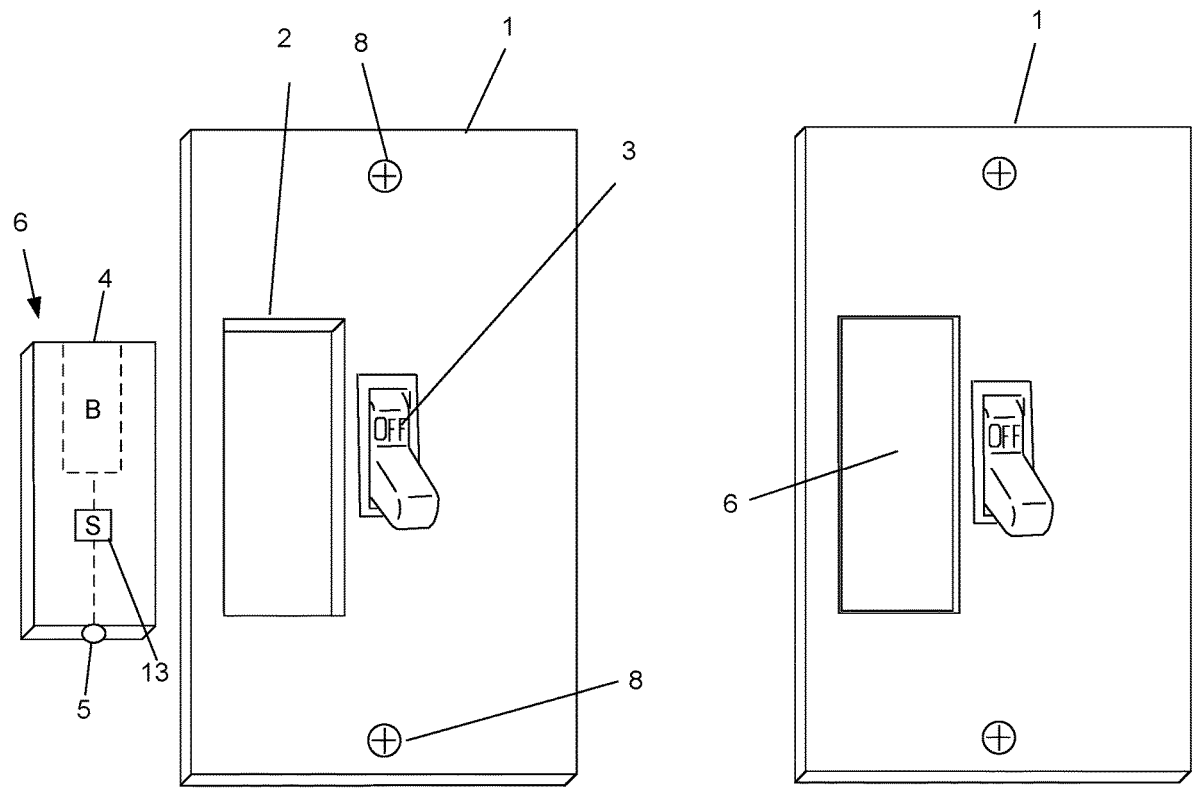
FIG. 1
FIG. 2
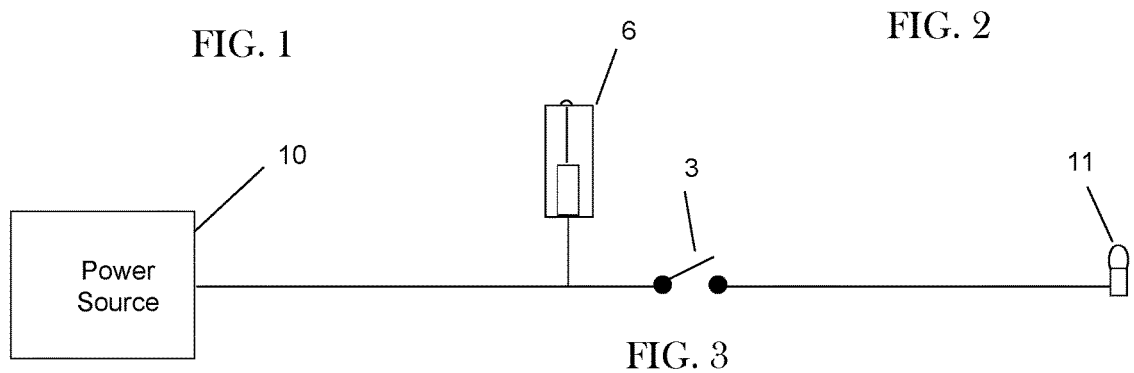
FIG. 3

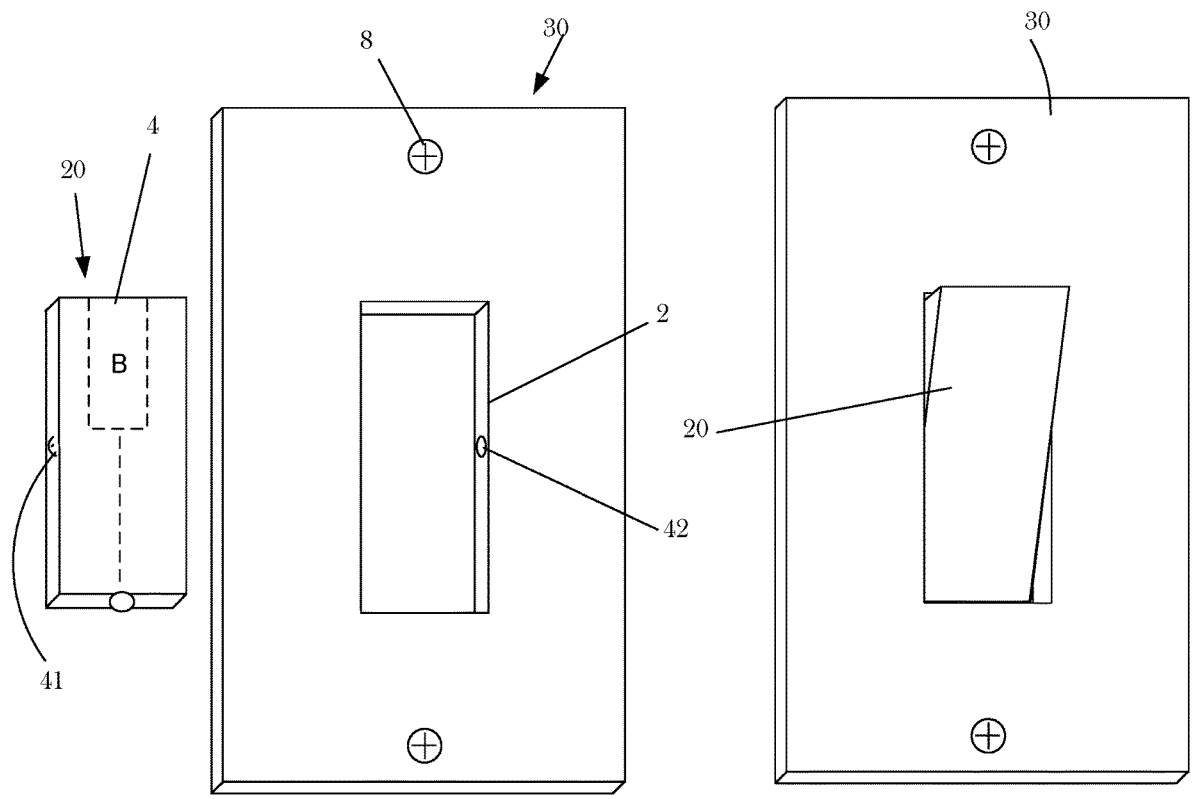
FIG. 4  FIG. 5
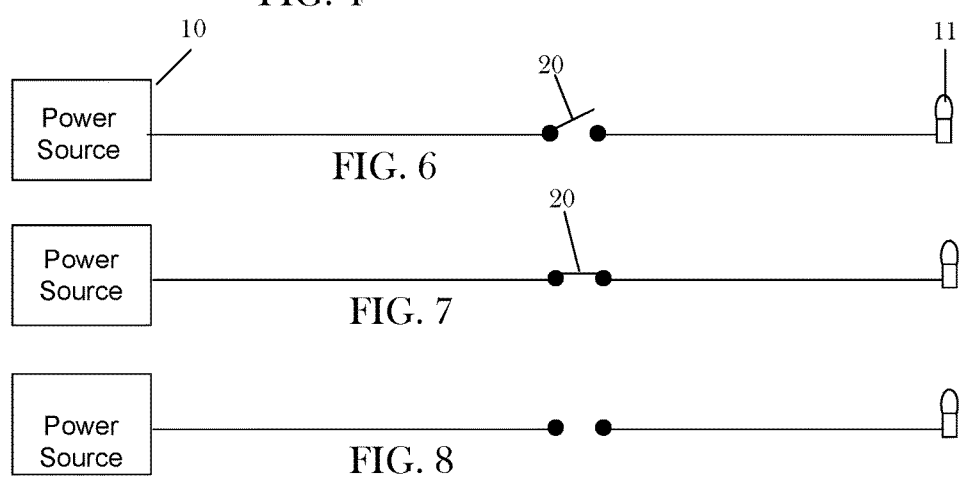
FIG. 6
FIG. 7
FIG. 8

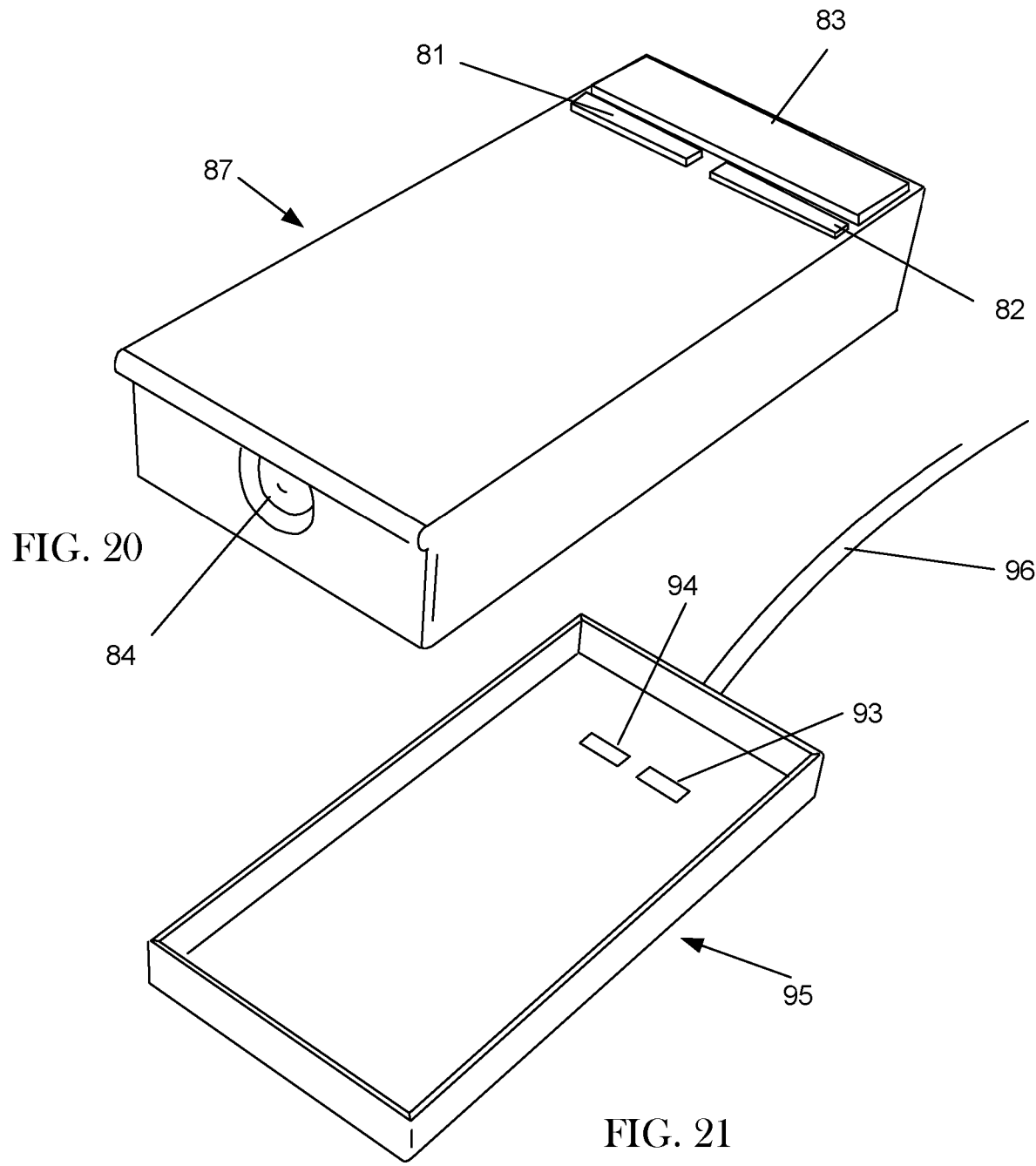

FLASHLIGHT WITH WIRELESS CONTROL SWITCHES

The present invention relates to flashlights, and in particular to flashlights removably connected to existing structures. This application is a Continuation-in-Part of U.S. patent application Ser. No. 17/517,852 filed Nov. 3, 2021, all of which is incorporated by reference herein.

BACKGROUND OF THE INVENTION

Flashlights are known in the prior art. A flashlight includes a battery, a bulb electrically connected to the battery and a switch for turning the flashlight on and off.

It is very common for home owners to own a flashlight. However, a flashlight is typically not an everyday use item. Therefore, it is common for a flashlight owner to have difficulty finding the flashlight when truly needed, such as in the event of a power outage. Or, even if the flashlight owner is able to find the flashlight, it may be unusable because the batteries are missing or expired.

Light switches are also known in the prior art. Prior art light switch 80 is shown in FIGS. 11 and 13. Prior art light switch 80 includes cover 87 and toggle switch 81. When a user manipulates toggle switch 81 to an on position, electricity is permitted to flow from power source 10 to bulb 11A (FIG. 13).

Light switch 80 includes cover 87. Cover 87 is also commonly referred to as a wall plate, a light switch cover, a light switch cover plate, a decorative light switch cover, or a switch plate. Cover 87 functions to cover the switch mechanism and electrical wiring that operate the installed electrical fixtures and helps to prevent electrocution. Cover 87 often has a plain design that blends with home decor.

What is needed is a device that allows for an easy-to-find flashlight that also blends in nicely with home décor.

SUMMARY OF THE INVENTION

The present invention provides a storage device for storing a removable flashlight. The storage device includes an electrical switch surrounded by a cover plate. A power source is electrically connected to the electrical switch. A removable flashlight is removably connected to the storage device. The removable flashlight is stored in the storage device and removable from the storage device when needed for use.

BRIEF DESCRIPTION OF THE DRAWINGS

FIGS. 1-3 show a first preferred embodiment of the present invention.

FIGS. 4-8 show a second preferred embodiment of the present invention.

FIGS. 18A-22 show another preferred embodiment of the present invention.

DETAILED DESCRIPTION OF THE PREFERRED EMBODIMENTS

First Preferred Embodiment

Figure 9:
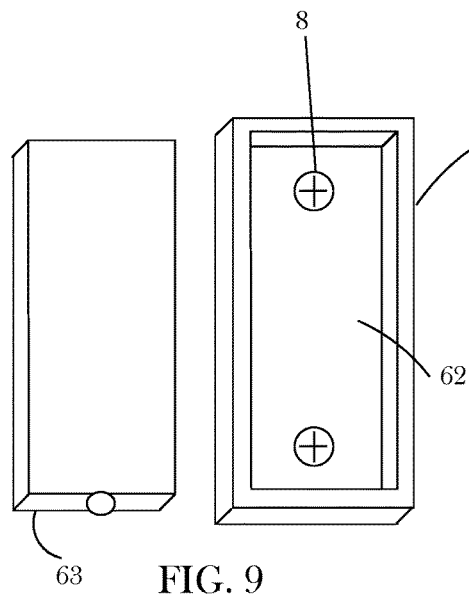
FIGS. 9, 10 and 12 show a third preferred embodiment of the present invention.

FIGS. 1-3 show a first preferred embodiment of the present invention. Power source 10 provides electricity to bulb 11, as shown in FIG. 3. By manipulating toggle switch 3, a user can turn bulb 11 on or off. Removable flashlight 6 includes rechargeable battery 4, on/off switch 13 and is electrically connected to power source 10, as shown.

In FIG. 1, light switch cover 1 includes cut-out section 2 and toggle switch 3. Light switch cover 1 is mounted to a wall by using mounting screws 8. Removable flashlight 6 is press-fit into cut-out section 2 for secure attachment, as shown in FIG. 2. When a user needs a flashlight, he can easily grab flashlight 6 with his fingers and remove it from cover 1. For example, in the event of a power outage, the user will easily be able to find removable flashlight 6 in the darkness because the user will know that removable flashlight 6 is attached to cover 1. The flashlight will be charged and ready to use when needed. When the user is done using flashlight 6, he can easily mount it back into cut-out section 2 so that flashlight 6 will once again be electrically connected to power source 10. It should be noted that in the preferred embodiment shown, flashlight 6 is close in height to cover 2, thereby providing an aesthetically pleasing appearance.

Second Preferred Embodiment

FIGS. 4-7 show a second preferred embodiment of the present invention. Power source 10 provides electricity to bulb 11, as shown in FIG. 6. By manipulating removable flashlight switch 20, a user can turn bulb 11 on or off. Flashlight switch 20 includes rechargeable battery 4 and is electrically connected to power source 10, as shown.

In FIG. 4, light switch cover 20 includes cut-out section 29. Cut-out section 29 allows for the pivotal connection of flashlight switch 20, as shown in FIG. 5. For example, when flashlight switch 20 is pivoted downward (FIG. 5, FIG. 7), switch 20 is closed permitting power to flow to bulb 11 turning it on.

Light switch cover 30 is mounted to a wall by using mounting screws 8. Flashlight switch 20 includes snap nodule 41 and cover 30 includes snap indention 42. Utilizing nodule 41 and indention 42, flashlight switch 20 is pivotally snap-fit into cut-out section 2 for secure attachment, as shown in FIG. 5. When a user needs a flashlight, he can easily grab flashlight switch 20 with his fingers and remove it from cover 30 (FIG. 4, FIG. 8). For example, in the event of a power outage, the user will easily be able to find flashlight switch 20 in the darkness because the user will know that flashlight switch 20 is attached to cover 30. The flashlight will be charged and ready to use when needed. When the user is done using flashlight switch 20, he can easily mount it back into cut-out section 29 so that flashlight switch 20 will once again be electrically connected to power source 10. It should be noted that in the preferred embodiment shown, flashlight switch 20 has the appearance of a common rocker switch, thereby providing an aesthetically pleasing appearance.

Third Preferred Embodiment

In the third preferred embodiment a user can connect additional removable flashlights to the electrical system without adding additional switches or modifying existing switches.

Figure 10:
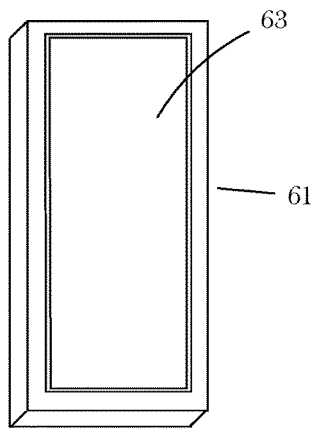
Figure 11:
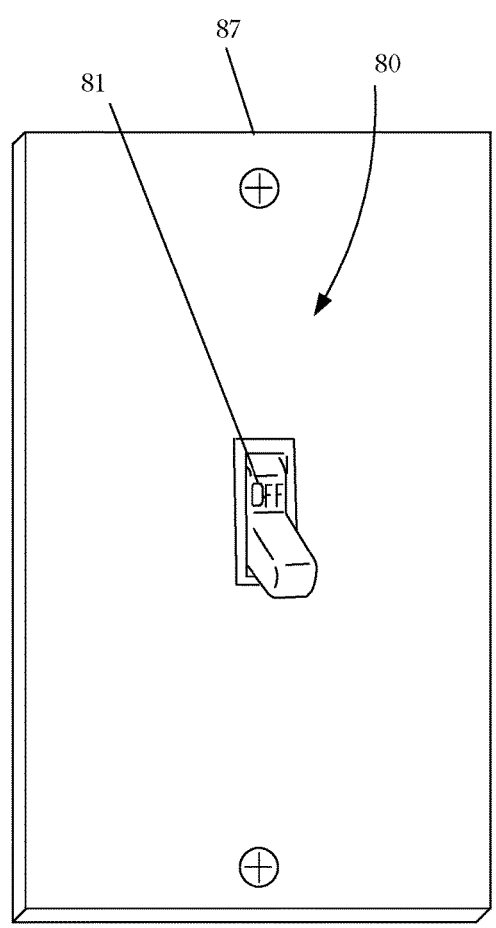
FIG. 11 shows a prior art electrical switch with cover plate.
Figure 12:
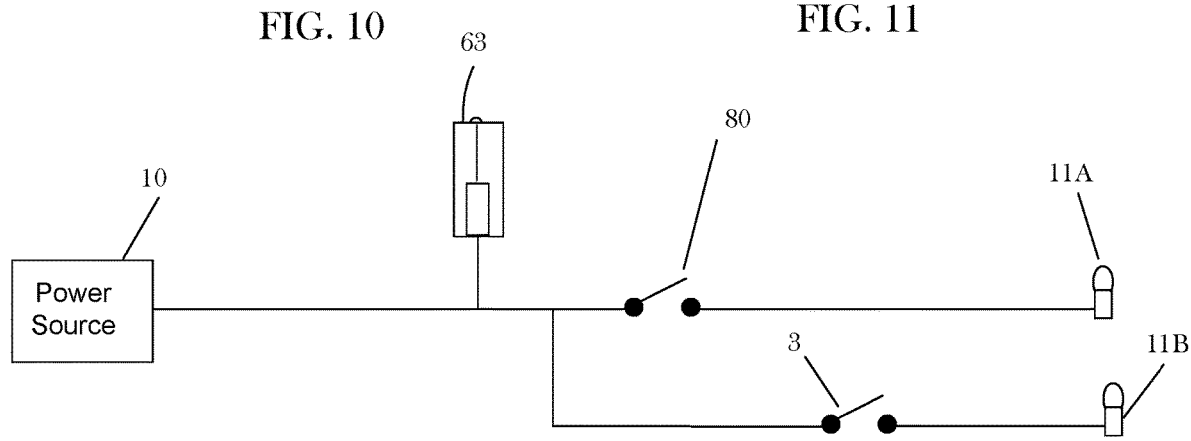
Figure 13:
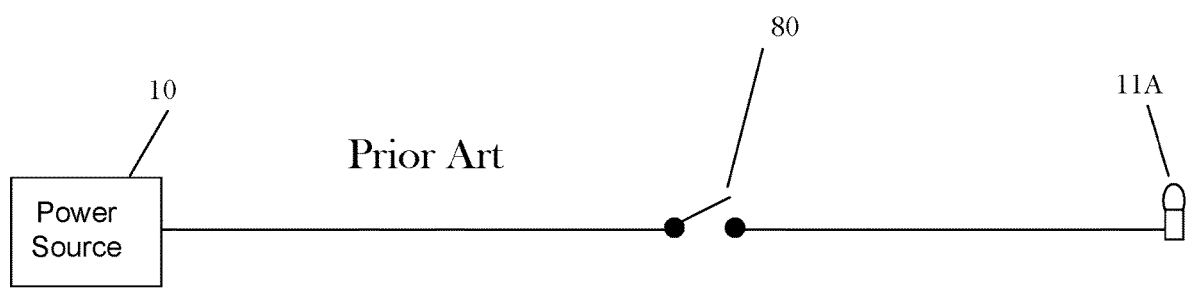
FIG. 13 shows a prior art electrical system.

FIGS. 9, 10 and 12 show a third preferred embodiment of the present invention. Power source 10 provides electricity to bulb 11A and bulb 11B, as shown in FIG. 12. By manipulating prior art light switch 80 a user can turn bulb 11A on or off and by manipulating light switch 3 a user can turn bulb 11B on and off. Additionally, removable flashlight 63 mounted onto cover 61 is also electrically connected to power source 10 for charging.

In FIG. 9, cover 61 includes cut-out section 62. Cut-out section 62 allows for the press-fit connection of removable flashlight 63, as shown in FIG. 9. Cover 61 is mounted to a wall by using mounting screws 8. When a user needs a flashlight, he can easily grab flashlight 63 with his fingers and remove it from cover 61. For example, when the user needs a flashlight, the flashlight will be charged and ready to use. When the user is done using flashlight 63, he can easily mount it back into cut-out section 62 so that flashlight 63 will once again be electrically connected to power source 10. It should be noted that in the preferred embodiment shown, flashlight 63 mounted onto cover 61 has the pleasing aesthetic appearance as shown in FIG. 10.

Fourth Preferred Embodiment

Figure 14:
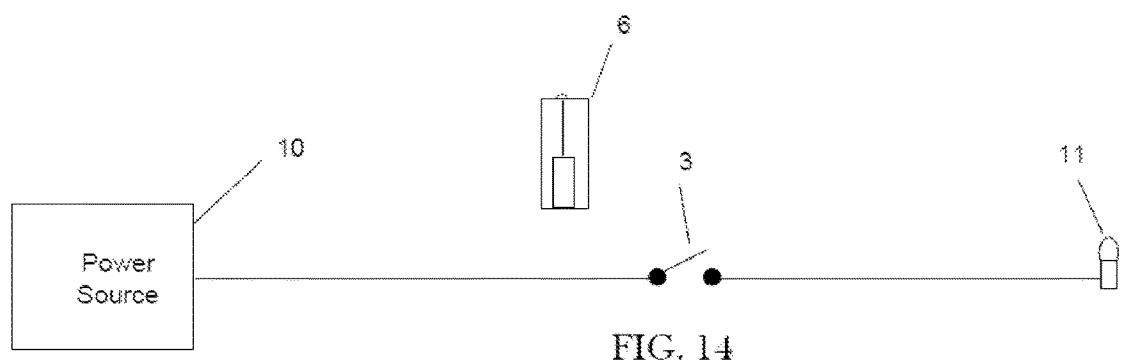
FIG. 14 shows another preferred embodiment of the present invention.

A fourth preferred embodiment is shown in FIG. 14. The fourth preferred embodiment is very similar to the first preferred embodiment shown in FIGS. 1-3. However, in FIG. 14, removable flashlight 6 is not electrically connected to power source 10. The fourth preferred embodiment recognizes that it is not necessary for flashlight 6 to be rechargeable or connected to power supply 10.

For example, many flashlight owners would prefer to simplify installation of the present invention. In the fourth preferred embodiment a flashlight owner would purchase cover 1 along with removable flashlight 6. Then the owner would only need to replace his existing cover with cover 1 having flashlight 6. The owner would be responsible for making sure that flashlight 6 contains charged batteries. Or the owner would need to be responsible for making sure charged batteries were easily accessible when flashlight 6 was needed.

Switch Covers

Figure 15:
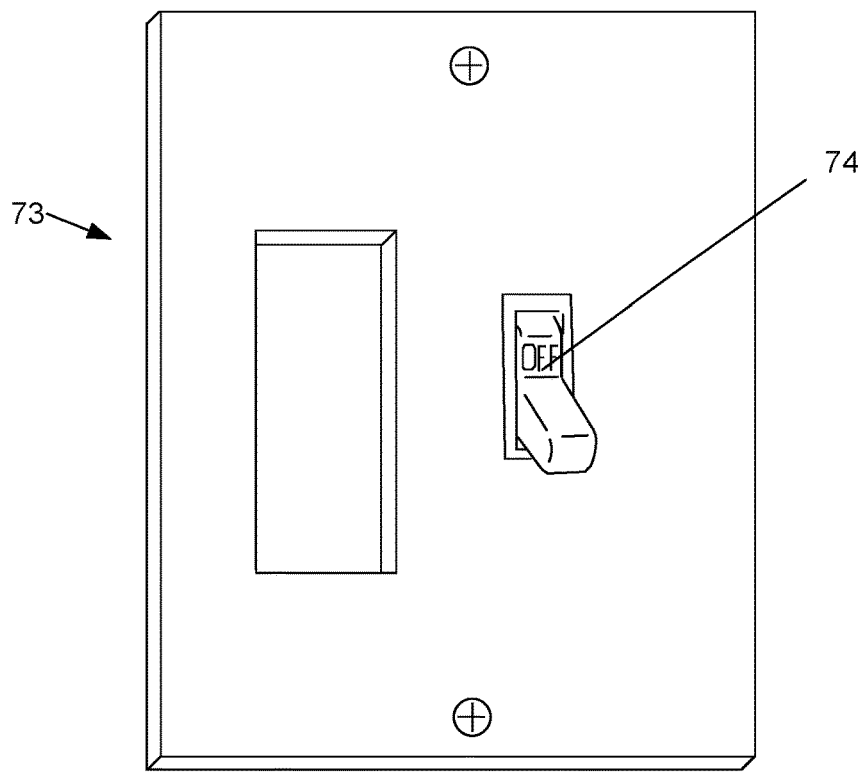
FIGS. 15-17 show preferred light switch cover plates.
Figure 16:
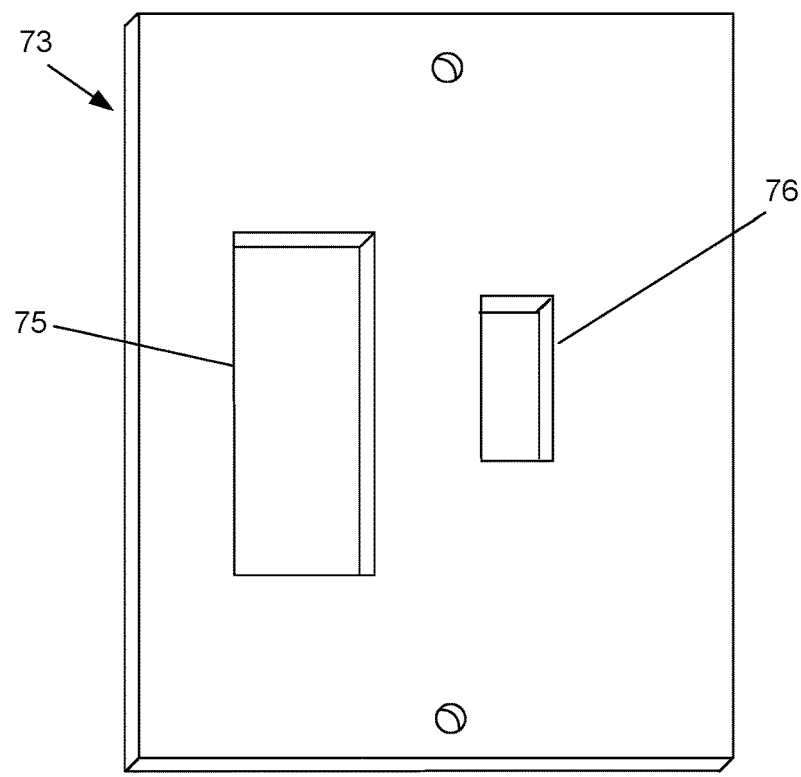
Figure 17:
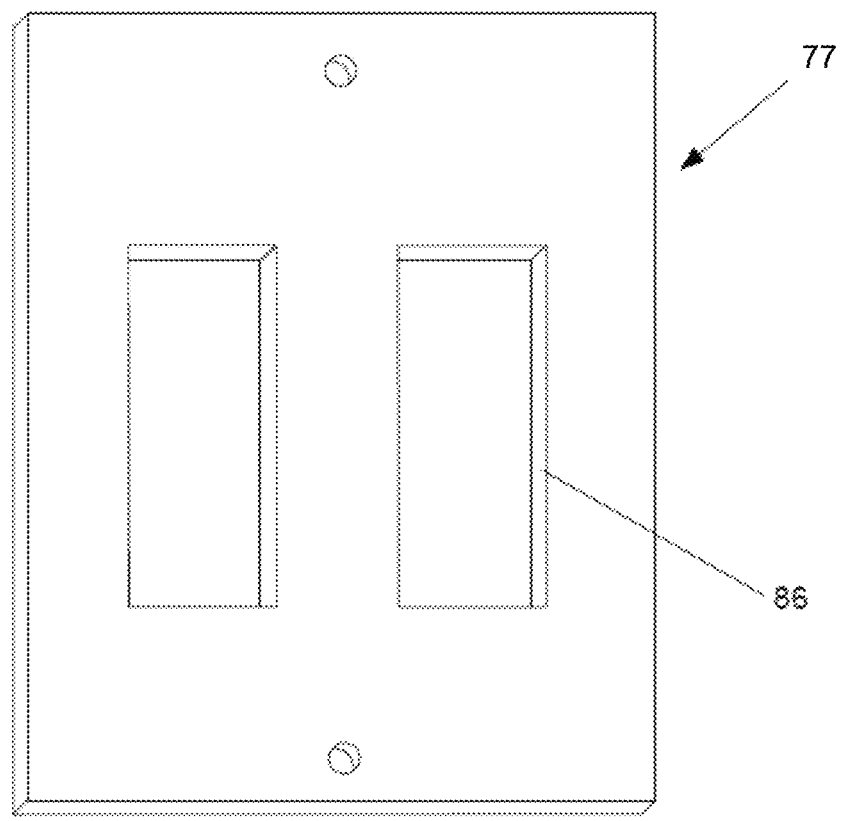

FIGS. 15-17 show a clear presentation of preferred light switch cover plates. FIG. 15 shows cover 73 installed on a wall. FIG. 16 shows cover 73 prior to installation. In FIG. 15 cover 73 is installed over pre-existing installed toggle light switch 74. Cover 73 includes cut-out sections 75 and 76. Switch 74 extends through cut-out section 76. A flashlight, such as flashlight 6 (FIG. 1) may be press fit into cut-out section 75 for storage, as described in detail above. Cover plate 77 (FIG. 17) is very similar to cover plate 73. However, cover plate 77 includes larger size cut-out section 86 to accommodate a larger sized pre-existing rocker switch.

Fifth Preferred Embodiment

Figure 22:
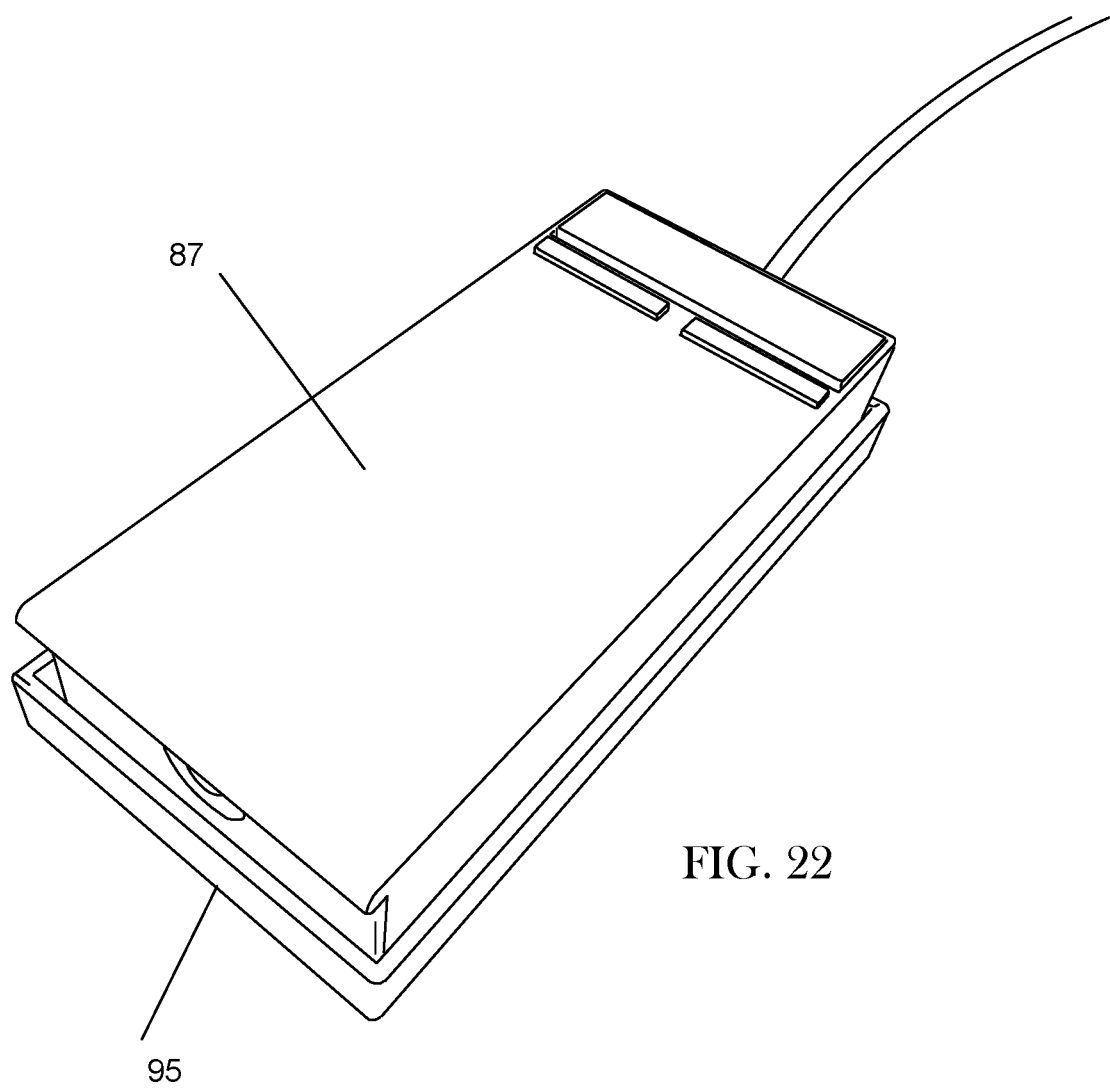

The fifth preferred embodiment recognizes that the removable flashlight may also be used as a room dimmer switch for controlling the brightness of light within the room. The fifth preferred embodiment is show in FIGS. 18A-22. In the fifth preferred embodiment, flashlight 87 is housed in desktop cradle 95 (FIG. 19, FIG. 22). While housed in desktop cradle 95, flashlight 87 is continuously charged via charging plates 93 and 94 (FIG. 21). Light from flashlight 87 is emitted from bulb 84.

Flashlight 87 includes microprocessor 45 and wireless signal transmitter 51 to transmit wireless control signals to switch 30. The wireless control switches include on/off switch 83 (for turning bulb 11A on and off) and dimmer switch 81 (for making bulb 11A dimmer) and dimmer switch 82 (for making bulb 11A brighter).

Microprocessor 45 also includes programming to turn "on" flashlight 87 automatically in the event of a power disruption from power source 10. For example, if microprocessor 45 senses a disruption of power from charging plates 93 and 94, flashlight 87 will turn "on".

FIG. 22 shows flashlight 87 housed in desktop cradle 95. Bulb 84 is exposed and flashlight 87 may provide illumination while housed in desktop cradle 95.

Figure 18A:
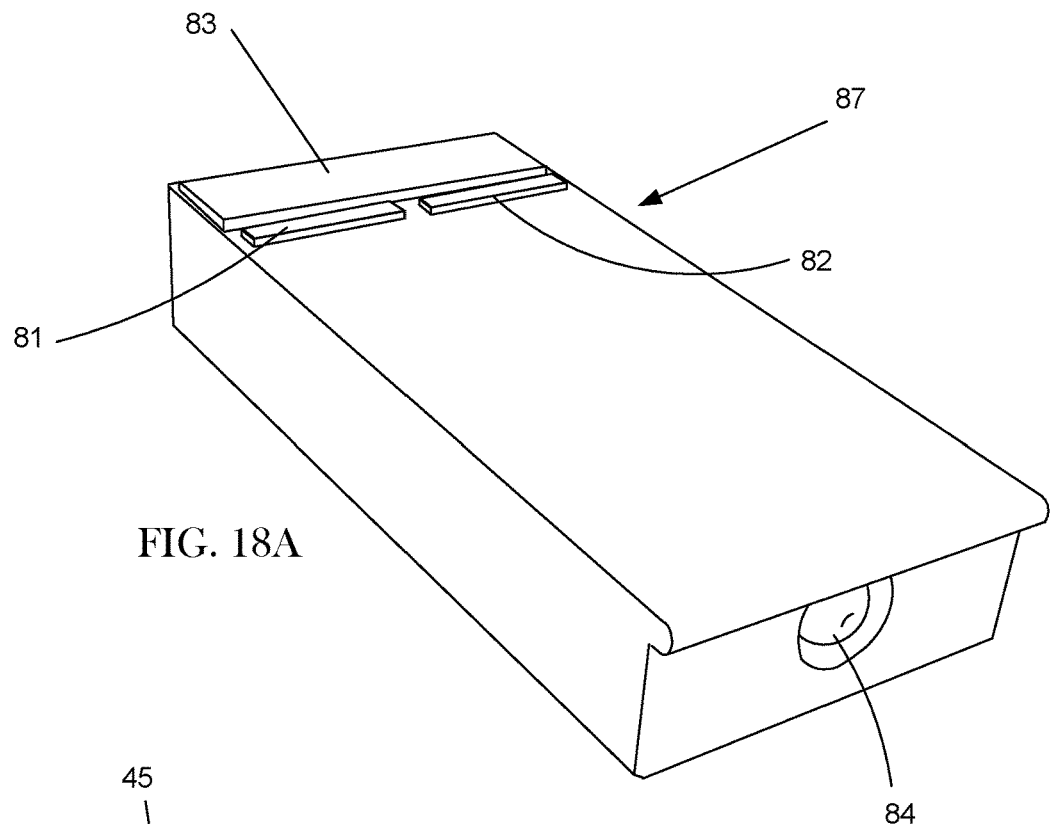
Figure 18B:
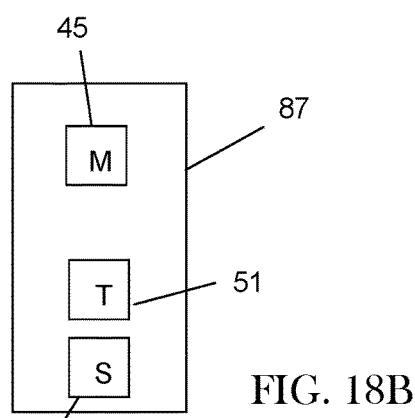
Figure 19:
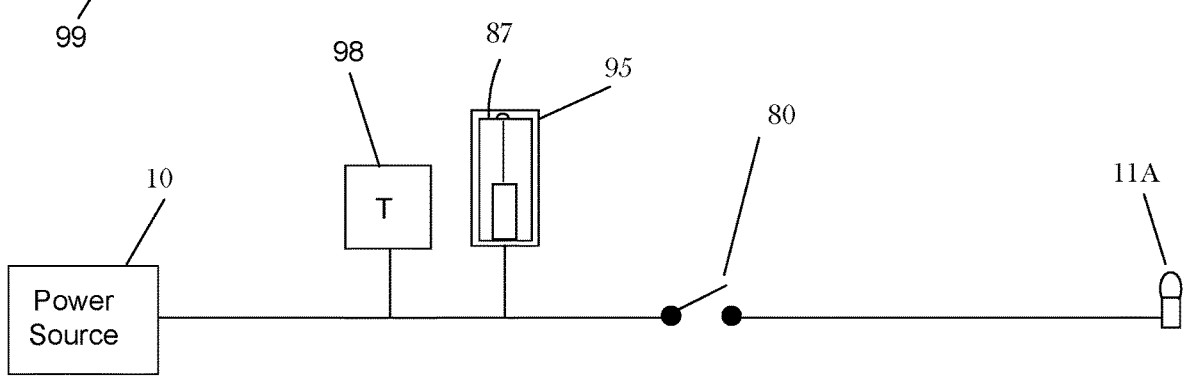

Also, in another preferred embodiment flashlight 87 includes speaker 99 (FIG. 18B). Speaker 99 is connected to microprocessor 45 and will emit an audible sound if transmitter button 98 is pressed. Transmitter button 98 is connected to house power source 10 and may be pressed if flashlight 87 has been misplaced. The user will hear the audible sound and be able to easily find flashlight 87. Transmitter button 87 may be mounted on a nearby wall, on desktop cradle 95 or on or next to a light switch cover plate.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A flashlight comprising:
A. a flashlight bulb, and
B. a plurality of wireless control switches;
wherein the wireless control switches control a wirelessly connected light source, the flashlight is removably housed in a desktop cradle, the flashlight being charged by the desktop cradle, and the flashlight bulb turning on in the event of a disruption of power from the desktop cradle.

2. The flashlight of claim 1, wherein the wireless control switches comprise dimmer switches for remotely controlling the brightness of the wirelessly connected light source.

3. The flashlight of claim 1, wherein said flashlight comprises a microprocessor comprising programming for wirelessly controlling the wirelessly connected light source and comprising programming for controlling said flashlight bulb.

4. The flashlight of claim 1, further comprising a speaker, wherein said speaker emits an audible sound when a wirelessly connected transmitter button is pressed.

* * * * *